(12) United States Patent
Yamamoto et al.

(10) Patent No.: US 6,883,876 B2
(45) Date of Patent: Apr. 26, 2005

(54) CRAWLER TYPE TRAVELING APPARATUS, SPROCKET FOR CRAWLER BELT AND SEGMENTS THEREOF

(75) Inventors: Teiji Yamamoto, Hirakata (JP); Akira Hashimoto, Hirakata (JP)

(73) Assignee: Komatsu Limited, Tokyo (JP)

( * ) Notice: Subject to any disclaimer, the term of this patent is extended or adjusted under 35 U.S.C. 154(b) by 0 days.

(21) Appl. No.: 10/394,648

(22) Filed: Mar. 24, 2003

(65) Prior Publication Data

US 2004/0012260 A1 Jan. 22, 2004

(30) Foreign Application Priority Data

Mar. 29, 2002 (JP) ........................................ 2002-095321

(51) Int. Cl.⁷ ........................... B60S 1/62; B62D 55/12; F16H 57/00
(52) U.S. Cl. ........................ 305/115; 305/196; 305/199
(58) Field of Search ................................ 305/100, 115, 305/195, 199, 137, 196

(56) References Cited

U.S. PATENT DOCUMENTS

| | | | | |
|---|---|---|---|---|
| 3,880,478 A | * | 4/1975 | Baylor et al. | 305/115 |
| 3,899,219 A | * | 8/1975 | Boggs | 305/115 |
| 4,175,796 A | * | 11/1979 | Boggs et al. | 305/115 |
| 5,769,512 A | * | 6/1998 | Kautsch | 305/199 |
| 5,899,541 A | * | 5/1999 | Ying et al. | 305/115 |
| 6,123,399 A | * | 9/2000 | Snyder | 305/107 |
| 6,371,579 B1 | * | 4/2002 | Phely | 305/115 |

* cited by examiner

Primary Examiner—Russell D. Stormer
Assistant Examiner—Jason R. Bellinger
(74) Attorney, Agent, or Firm—Westerman, Hattori, Daniels & Adrian, LLP

(57) ABSTRACT

The invention provides a crawler type traveling apparatus which can be stably used for a long time period, and furthermore provides a crawler belt sprocket and a segment thereof which is best suited for the crawler type traveling apparatus.

A crawler type traveling apparatus is provided with a crawler belt (3) and a crawler belt sprocket (2). The crawler belt (3) is structured such that a plurality of links (4) are connected via a bearing structure body (5) having a pin (7) a bush (8) which is outward fitted to the pin (7), and seal member (10, 10) which are arranged in both end sides of the bush (8). Guide portions (G, G) making an intrusion into a portion between the relatively facing links (4, 4) are protruded from both side surfaces of the sprocket (2). The sprocket (2) is connected via the bearing structure body (5), and a gear tooth portion (26) thereof makes an intrusion into the portion between the relatively facing links (4, 4) so as to be engaged with the bush (8). Space portions (36, 36) are formed in an outer side of the seal members (10, 10) in the engagement state.

6 Claims, 12 Drawing Sheets

"PRIOR ART"

Pressure Measured Portion (●部)

even when the earth and sand makes an intrusion into the portion between a gear tooth bottom portion of the crawler belt sprocket and the bush, the sprocket is in a state of moving close to a side of any of the links, and the earth and sand is pressed out to a close side due to a pressing operation of the crawler belt sprocket to a side of the bush, the earth and sand is fed to the space portion. Accordingly, it is possible to intend to reduce an intrusion pressure of the earth and sand into the seal members arranged in both end sides of the bush. Therefore, it is possible to prevent the earth and sand from making an intrusion into the seal member and it is possible to prevent the seal members from being broken (damaged), whereby it is possible to stably use the crawler type traveling apparatus for a long time period.
CRAWLER TYPE TRAVELING APPARATUS, SPROCKET FOR CRAWLER BELT AND SEGMENTS THEREOF

BACKGROUND OF THE INVENTION

1. Field of the Invention

The present invention relates to a crawler type traveling apparatus, a sprocket for a crawler belt and a segment thereof.

2. Description of Prior Art

A crawler type traveling apparatus is provided as a traveling apparatus (a chassis apparatus) of a crawler type vehicle such as a bulldozer or the like. The crawler type traveling apparatus is provided with an idler, a sprocket and a crawler belt which is wound around a periphery of the idler and the sprocket. The crawler belt is provided with a plurality of links 61 and a bearing structure body 62 connecting a plurality of links 61, as shown in FIG. 8.

As the bearing structure body 62, there is a structure provided with a pin 64, and a first and second bushes 65, 66 and 66 which are outward fitted to the pin 64. Further, there is set a state in which end portions 67 and 68 of the adjacent links 61 and 61 are overlapped, the second bushes 66 and 66 are press inserted into holes 67a and 67a of end portions 67 and 67 in an inner sides of the relatively facing links 61 and 61, and the pin 64 is rotatably inserted into the bushes 66 and 66. At this time, an end portion of the pin 64 is press inserted into holes 68a and 68a of end portions 68 and 68 in an outer side of the links 61 and 61. Further, a first bush 65 is outward fitted to the pin 64 between the end portions 67 and 67 in the inner side of the relatively facing links 61 and 61. Further, seal members 70 and 70 are interposed between the bushes 65 and 66, and a seal member 74 is also interposed between the second bush 66 and the link 61.

A pair of endless bodies 71 and 71 are formed by connecting the relatively facing links 61 and 61 respectively in a longitudinal direction via the pin 64 and the bushes 65, 66 and 66, and a shoe plate (not shown) is mounted to the endless bodies 71 and 71. Further, the constructed crawler belt is wound around a periphery of the idler and the sprocket, and travels in accordance with a rotation of the sprocket. In this case, as shown in FIG. 9, a gear tooth portion 73 of the sprocket 72 and the first bush 65 are engaged with each other.

In this case, in the conventional sprocket 72, a face width W of the gear tooth portion 73 is slightly smaller than a size between the inner end portions 67 and 67 of the links 61 and 61. Further, in the sprocket 72, a gear tooth side surface 75 facing to the inner end surface of the link 61 is formed in an unrelieved flat shape. Accordingly, when the gear tooth portion 73 of the sprocket 72 and the first bush 65 are engaged, an earth and sand makes an intrusion into a portion between a gear tooth bottom portion 76 and the first bush 65. Further, if the sprocket 72 becomes in a state of coming close to a side of any one of the link 61 or being in contact with any one of the link 61, the earth and sand has no escape, the earth and sand is pressed to a side of a seal member 70 in accordance with a pressing force of the sprocket 72 to the first bush 65, and there is a risk that an intrusion pressure of the earth and sand is applied to the seal member 70. If the intrusion pressure (a soil pressure) is applied, there is a risk that a seal function can not be sufficiently achieved in accordance that the earth and sand makes an intrusion into the seal member 70, and the seal member 70 is damaged (broken).

Further, if it is impossible to achieve the seal function, a lubricating oil supplied between the bush 65 and the pin 64 flows out to an external portion, the bush 65 and the pin 64 do not smoothly slide, and a seize is generated between the pin 64 and the bush 65, thereby reducing a service life of the crawler type traveling apparatus.

SUMMARY OF THE INVENTION

The present invention is made by solving the conventional disadvantages mentioned above, an object of the present invention is to provide a crawler type traveling apparatus which can be stably used for a long time period, and another object of the present invention is to provide a crawler belt sprocket and a segment thereof which can achieve the object mentioned above.

In accordance with a first aspect of the present invention, there is provided a crawler type traveling apparatus comprising:

a crawler belt to which a plurality of links are connected via a bearing structure body having a pin, a bush outward fitted to the pin, and seal members arranged in both end sides of the bush: and a crawler belt sprocket in which a gear tooth portion makes an intrusion into a portion between a pair of links connected via the bearing structure body and facing to each other so as to be engaged with the bush, wherein a space portion is formed in an outer side of the seal member in a state of engagement between the gear tooth portion of the crawler belt sprocket and the bush by protruding a guide portion making an intrusion into the portion between the relatively facing links from both side surfaces of the crawler belt sprocket.

In accordance with the crawler type traveling apparatus on the basis of the first aspect, even when the earth and sand makes an intrusion into the portion between a gear tooth bottom portion of the crawler belt sprocket and the bush, the sprocket is in a state of moving close to a side of any of the links, and the earth and sand is pressed out to a close side due to a pressing operation of the crawler belt sprocket to a side of the bush, the earth and sand is fed to the space portion. Accordingly, it is possible to intend to reduce an intrusion pressure of the earth and sand into the seal members arranged in both end sides of the bush. Therefore, it is possible to prevent the earth and sand from making an intrusion into the seal member and it is possible to prevent the seal members from being broken (damaged), whereby it is possible to stably use the crawler type traveling apparatus for a long time period.

In accordance with a second aspect of the present invention, there is provided a crawler belt sprocket in which a gear tooth portion makes an intrusion into a portion between a pair of links connected via a bearing structure body having a pin, a bush outward fitted to the pin, and seal members arranged in both end sides of the bush and facing to each other, thereby being engaged with the bush, wherein a guide portion is protruded to both side surfaces.

In accordance with the crawler belt sprocket on the basis of the second aspect, it is possible to form the space portion in an outer side of the seal member by protruding the guide portion to both side surfaces, and it is possible to intend to reduce the intrusion pressure of the earth and sand into the seal members arranged in both end sides of the bush in the crawler belt. Therefore, it is possible to prevent the seal members from being broken (damaged).

In accordance with a third aspect of the present invention, there is provided a crawler belt sprocket, in which the guide portion is constituted by a protruding ring-shaped portion which is continuously provided in a peripheral direction.

In accordance with the crawler belt sprocket on the basis of the third aspect, since the guide portion is constituted by the protruding ring-shaped portion which is continuously provided in the peripheral direction, it is possible to improve a reliability of forming the space portion in the engagement state between the gear tooth portion of the crawler belt sprocket and the bush. Accordingly, it is possible to securely intend to reduce the intrusion pressure of the earth and sand into the side of the seal members by the space portion, and it is possible to effectively protect the seal members.

In accordance with a fourth aspect of the present invention, there is provided a crawler belt sprocket, in which the guide portion is constituted by a plurality of protruding portions which are discontinuously provided along a peripheral direction, and an interval portion between the adjacent protruding portions in the peripheral direction corresponds to a gear tooth bottom portion.

In accordance with the crawler belt sprocket on the basis of the fourth aspect, since the guide portion is constituted by a plurality of protruding portions which are discontinuously provided along the peripheral direction, and the interval portion between the adjacent protruding portions in the peripheral direction corresponds to the gear tooth bottom portion, the earth and sand making an intrusion into the space portion or the like can be discharged to an external portion from the interval portion. Therefore, it is possible to more effectively protect the seal members. Further, it is possible to save a material for the crawler belt sprocket by forming the interval portion, and it is possible to contribute to reduce a manufacturing cost.

In accordance with a fifth aspect of the present invention, there is provided a crawler belt sprocket, in which a protruding size of the guide portion and a size from the gear tooth bottom portion to the guide portion are respectively secured equal to or more than 6 mm.

In accordance with the crawler belt sprocket on the basis of the fifth aspect, since it is possible to secure the protruding size of the guide portion and the size from the gear tooth bottom portion to the guide portion equal to or more than 6 mm, it is possible to intend to reduce the intrusion pressure of the earth and sand into the side of the seal members even after an abrasion. Accordingly, it is possible to prevent the seal member of the bearing structure from being damaged so as to be unusable while the other mechanisms or the like are usable. That is, it is not necessary to carry out a maintenance such as replacement of parts or the like due to the damage of the seal members within an available operating time for the crawler type traveling apparatus, and it is possible to stably use the crawler belt sprocket.

In accordance with a sixth aspect of the present invention, there is provided a segment of a crawler belt sprocket corresponding to a part of the crawler belt sprocket as recited in any one of the second to fifth aspects, in which the segment is a member obtained by separating an outer peripheral portion of the crawler belt sprocket.

In accordance with the segment of the crawler belt sprocket on the basis of the sixth aspect, since the segment is constituted by the member obtained by separating the outer peripheral portion of the crawler belt sprocket, as well as it is possible to intend to reduce the intrusion pressure of the earth and sand into the seal members arranged in both end sides of the bush of the crawler belt, it is easy to replace the parts of the crawler belt sprocket and it is possible to improve the maintenance property.

DESCRIPTION OF THE PREFERRED EMBODIMENTS

Figure 3:
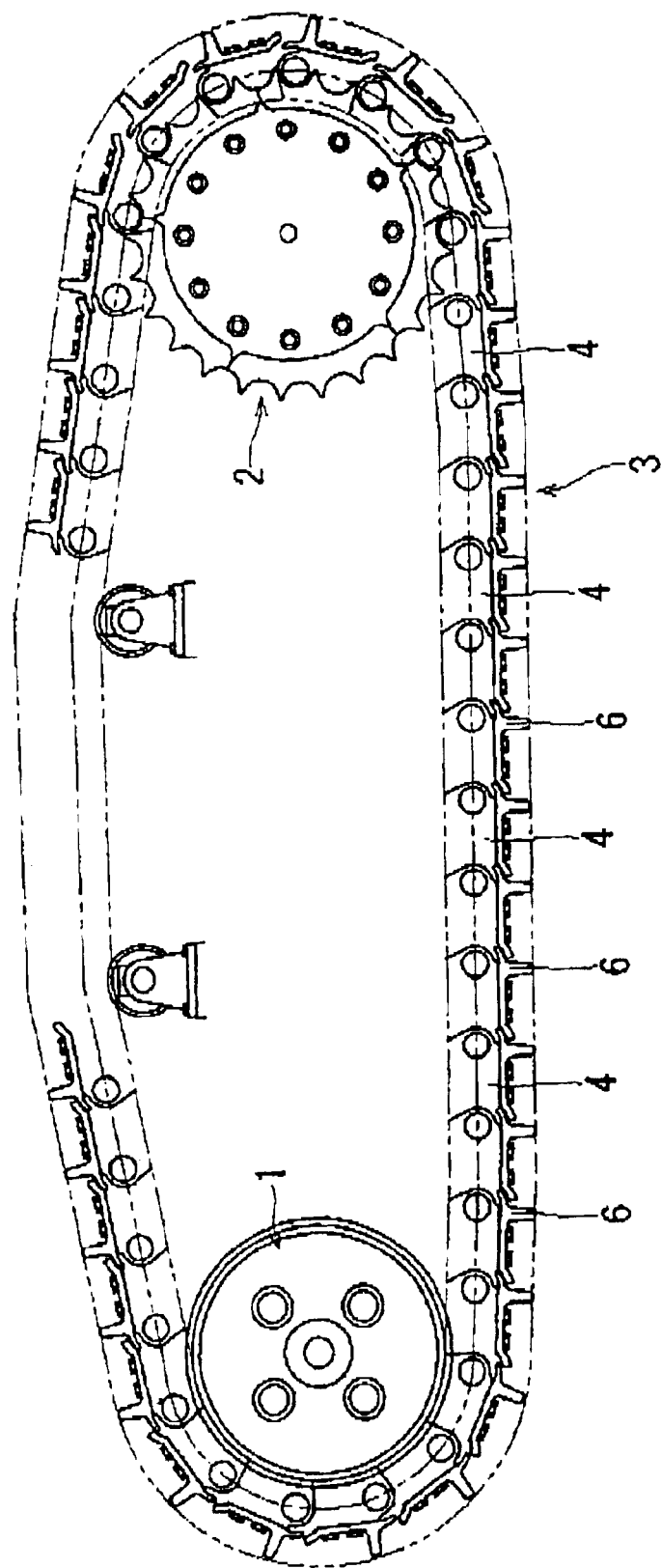
FIG. 3 is a side whole view of the crawler type traveling apparatus mentioned above.

Next, a description will be given in detail of particular embodiments of a crawler type traveling apparatus, a crawler belt sprocket and a segment thereof in accordance with the present invention, with reference to the accompanying drawings. FIG. 3 shows a side elevational view of a whole of the crawler type traveling apparatus in accordance with the present invention. The crawler type traveling apparatus is used in a construction machine such as a hydraulic shovel, a bulldozer or the like. Further, the crawler type traveling apparatus is provided with an idler 1, a crawler belt sprocket (hereinafter, refer simply to a sprocket in some cases) 2, and a crawler belt 3 wound around the idler 1 and the sprocket 2.

Figure 4:
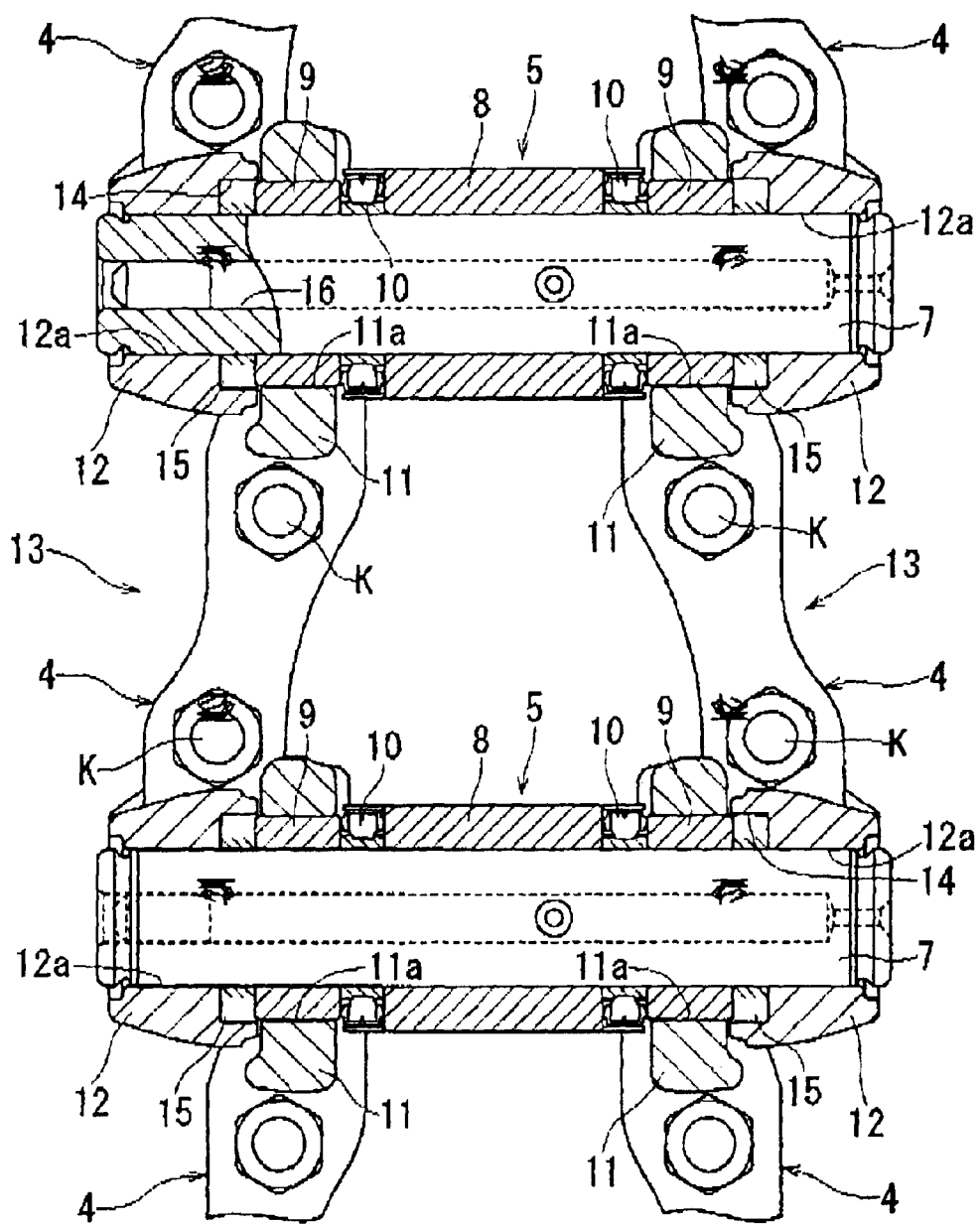
FIG. 4 is a cross sectional plan view of a main portion of the crawler type traveling apparatus mentioned above.

The crawler belt 3 is constituted, as shown in FIG. 4, by a plurality of links 4 which are connected in an endless manner, a bearing structure body 5 which connects the links 4, a plurality of shoe plates 6 (refer to FIG. 3) and the like. Further, the bearing structure body 5 is provided with a pin 7, first and second bushes 8, 9 and 9 which are outward fitted to the pin 7, seal members 10 and 10 which are interposed between the first and second bushes 8 and 9, and the like.

In this case, end portions 11 and 12 of the adjacent links 4 and 4 are overlapped with each other, the second bushes 9 and 9 are press inserted to holes 11a and 11a of the end portions 11 and 11 in an inner side of the relatively facing links 4 and 4, and the pin 7 is made in a state of being rotatably inserted into the bushes 9 and 9. At this time, an end portion of the pin 7 is press inserted to holes 12a and 12a of the end portions 12 and 12 in an outer side of the links 4 and 4. Further, the first bush 8 is outward fitted to the pin 7, between the end portions 11 and 11 in the inner side of the relatively facing links 4 and 4. That is, the crawler belt 2 is structured such that a pair of endless bodies 13 and 13 are formed by connecting the relatively facing links 4 and 4 respectively in a longitudinal direction via the pin 7 and the bushes 8, 9 and 9, and the shoe plate 6 (refer to FIG. 3) is mounted to the endless bodies 13 and 13 by a fastening device K constituted by a bolt and nut member. In this case, a thickness (an axial direction length) of the bush 9 is made approximately the same as a thickness (an axial direction length) of the end portion 11 of the link 4, and an inner end surface of the bush 9 and an inner end surface of the end portion 11 in the link 4 are arranged on approximately the same plane.

Figure 1:
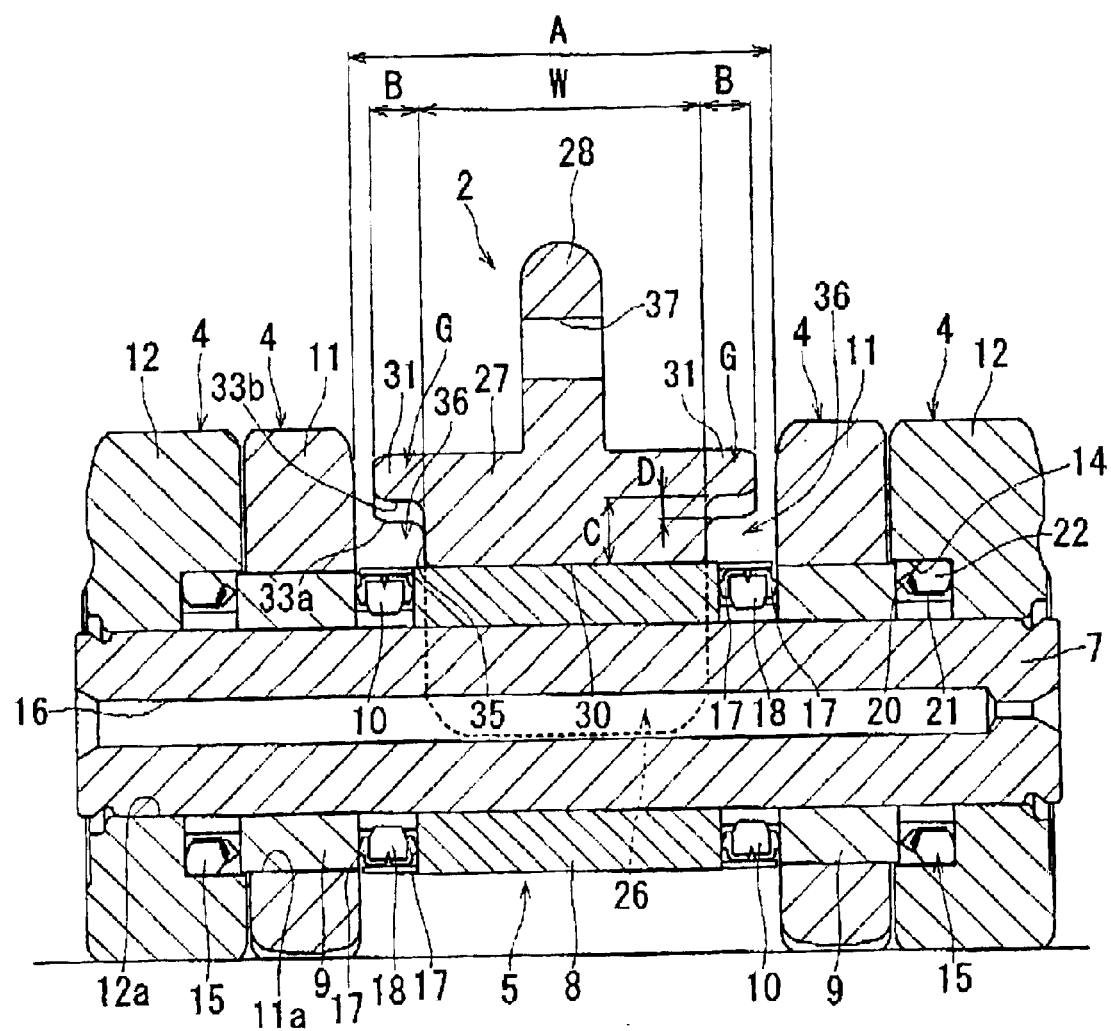
FIG. 1 is an enlarged cross sectional view of a main portion showing an embodiment of a crawler type traveling apparatus in accordance with the present invention.

Further, a recess portion 14 is provided in inner surfaces of the end portions 12 and 12, and a seal member 15 is fitted to the recess portion 14. Further, a hole portion 16 into which a lubricating oil is charged is provided in the pin 7, and it is set such that the lubricating oil within the hole portion 16 is supplied to a portion between the pin 7 and the bushes 8 and 9. In this case, as shown in FIG. 1, the seal member 10 interposed between the bushes 8 and 9 is provided with a pair of seal rings 17 having lip portions, and a load ring 18 applying a reaction force to the lip portion outward in an axial direction. Further, the seal member 15 fitted to the recess portion 14 is provided with a seal ring 20 having a lip portion, a support ring 21 supporting the seal ring 20, and a load ring 22 receiving a pressing force output from the lip portion of the seal ring 20.

Figure 2:
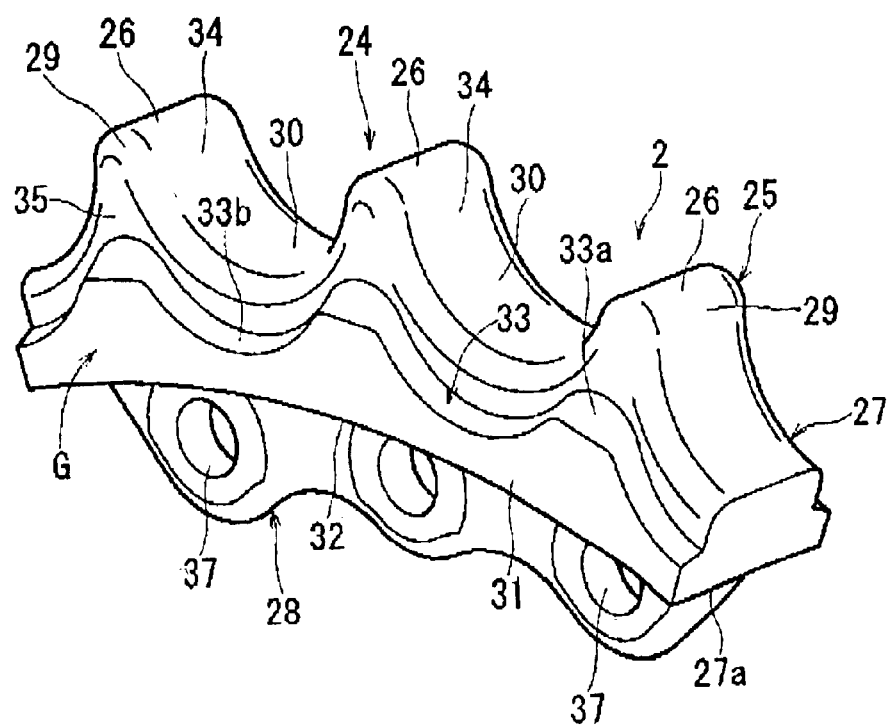
FIG. 2 is an enlarged perspective view of a main portion of a crawler belt sprocket of the crawler type traveling apparatus mentioned above.
Figure 5:
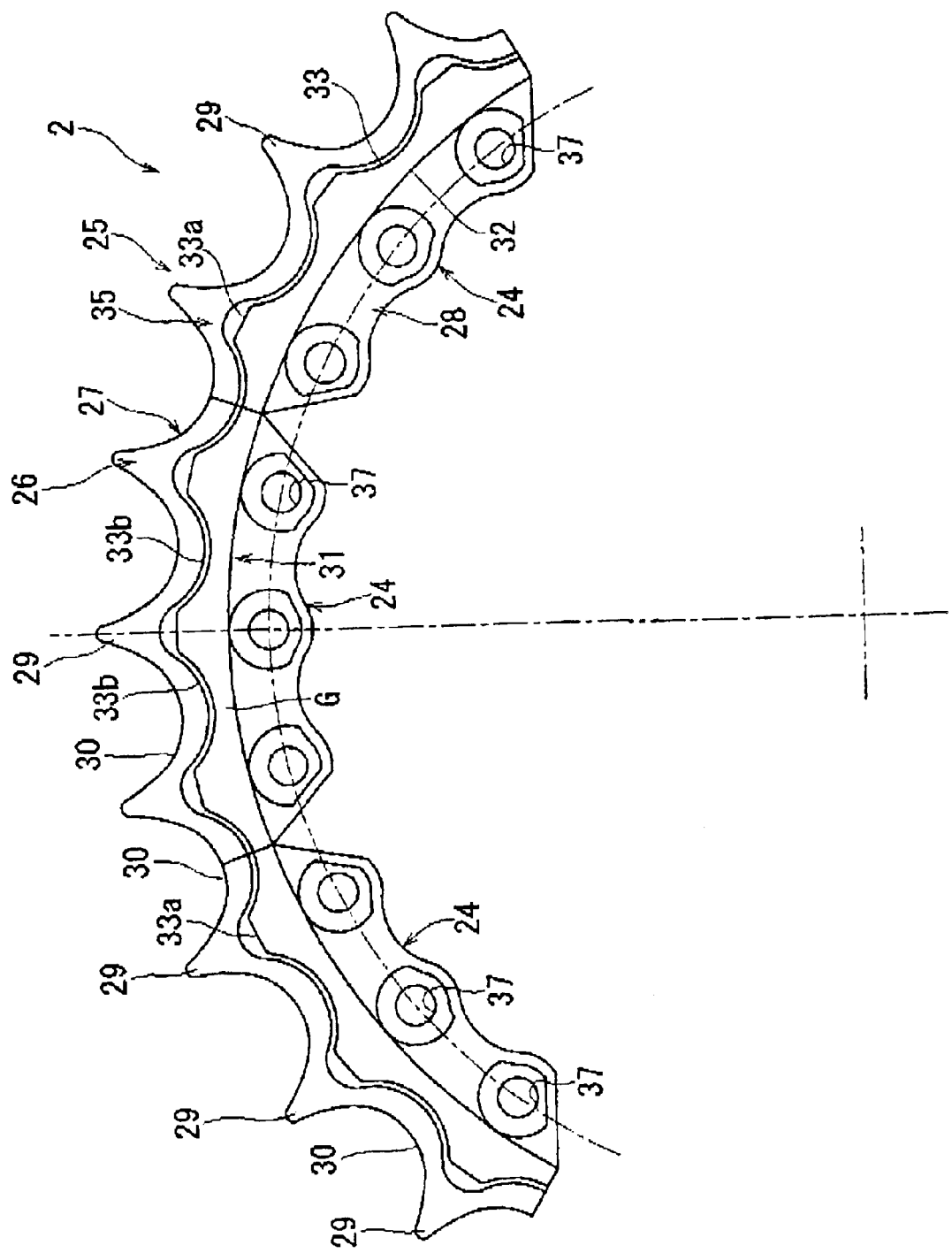
FIG. 5 is a side view of the crawler belt sprocket of the crawler type traveling apparatus mentioned above.

Next, the sprocket 2 is constituted, as shown in FIG. 5, by an outer peripheral member 25 having a circular ring shape, and a boss member (not shown) holding the outer peripheral member 25. Further, the outer peripheral member 25 is structured such that a plurality of (for example, nine) segments 24 as shown in FIG. 2 are arranged along a peripheral direction, and a whole shape is formed in a circular ring shape (a ring shape). That is, the segments 24 correspond to members obtained by separating the outer peripheral portion of the sprocket 2. Further, the outer peripheral member 25 is constituted by a main body portion 27 having a gear tooth portion 26, and an inner collar portion 28 for mounting to the boss member. Further, the main body portion 27 has the gear tooth portion 26 mentioned above on an outer peripheral surface thereof, and the gear tooth portion 26 is constituted by a convex portion forming a gear tooth point portion 29, and a recess portion forming a gear tooth bottom portion 30. Further, a guide portion G constituted by a protruding ring-shaped portion 31 which is provided continuously in a peripheral direction, is provided in both side surfaces of the main body portion 27. In this case, the guide portion G is structured such that an inner peripheral surface 32 is formed in a circular arc surface which is connected to an inner peripheral surface 27a of the main body portion 27, and an outer peripheral surface 33 is formed in a wavy surface. That is, the outer peripheral surface 33 of the guide portion G is structured such that a portion corresponding to the gear tooth point portion 29 forms a convex portion 33a, and a portion corresponding to the gear tooth bottom portion 30 forms a concave portion 33b.

Further, as shown in FIG. 2, the inner collar portion 28 protrudes in an inner diameter direction from a center portion in a thickness direction of the inner peripheral surface 27a in the main body portion 27, and through holes 37 are provided at a predetermined pitch along a peripheral direction. The through hole 37 is a hole through which a bolt member for mounting the outer peripheral member 25 to the boss member is inserted.

In this case, in one segment 24, since three gear tooth point portions 29, and three through holes 37 are provided, twenty seven gear tooth point portions 29 are provided, in the case that the sprocket 2 is formed by using nine segments 24. As described above, in the case that the crawler belt sprocket 2 employs the segments 24 corresponding to members obtained by separating the outer peripheral portion of the crawler belt sprocket 2, it is easy to replace the part of the crawler belt sprocket 2, and it is possible to improve a maintenance property.

The sprocket 2 formed in the shape mentioned above is structured, in this case, as shown in FIG. 1, such that, for example, in the case that a size A between the end portions 11 and 11 of the relatively facing links 4 and 4 is set to 102 mm, a gear tooth width W of the gear tooth portion 26 is set to 71.6 mm, a protruding size B of the guide portion G is set to 12.2 mm, and a size from the gear tooth bottom portion 30 to the concave portion 33b of the outer peripheral surface 33 in the guide portion G (a size from the outer peripheral surface of the bush 8 at a time when the sprocket 2 is engaged with the bush 8 to the concave portion 33b of the outer peripheral surface 33 in the guide portion G) C is set to 15 mm. Further, a height size D of the convex portion 33a of the outer peripheral surface 33 in the guide portion G is set to 5 mm.

Accordingly, in an engagement state between the gear tooth portion 26 of the sprocket 2 and the bush 8, the guide portion G is going to make an intrusion into the portion between the relatively facing links 4 and 4. In accordance with this structure, a space portion 36 is formed between a gear tooth side surface 35 of the gear tooth portion 26 and the link 4 (particularly, the end portion 11 of the link 4). Accordingly, even when the guide portion G becomes in a state of being brought into contact with the end portions 11 of the relatively facing links 4, it is possible to secure the space 36. In this case, the gear tooth side surface 35 corresponds to a side surface of the main body portion 27 in an outer diameter side rather than the guide portion G. Further, a thickness size of the seal member 10 (an axial direction length) is set to about protruding size B of the guide portion G (for example, 12.2 mm).

As mentioned above, in accordance with the crawler type traveling apparatus, the space portion 36 is formed among the lower surface of the guide portion G, the gear tooth side surface 35 of the gear tooth portion 26, the inner side surface of the link 4 and the outer surface of the bush 8, in the engagement state between the gear tooth portion 26 of the sprocket 2 and the bush 8, the seal members 10 and 10 are not adversely affected even in the case that the earth and sand makes an intrusion into the portion between the gear tooth surface 34 to the gear tooth bottom portion 30 in the sprocket 2 and the bush 8. That is, even when the sprocket 2 moves close to or is in contact with the inner end surface of any one of the links 4, the earth and sand making an intrusion into the portion between the bush 8 and the sprocket 2 can escape to the space portion 36, and it is possible to reduce the earth and sand intrusion pressure into the side of the seal members 10 and 10 arranged in both end sides of the bush 8. Further, since the thickness size (the axial direction length) of the seal member 10 is set to about the protruding size B of the guide portion G, and the inner end surface of the bush 9 and the inner end surface of the end portion 11 are arranged on approximately the same plane, the space portion 36 is formed in the outer peripheral side of the seal member 10 arranged between the bushes 8 and 9. Accordingly, there is not generated the matter that the earth and sand is held between the seal members 10 and 10, and the toot bottom portion 30 so as to press the seal members 10 and 10. Accordingly, in the crawler type traveling apparatus, it is possible to prevent the seal member 10 from being damaged by the earth and sand during the traveling or the like, and it is possible to prevent the earth and sand from making an intrusion into the seal member 10, whereby it is possible to intend to achieve a long service life. Further, since the guide portion g is constituted by the protruding ring-shaped portion 31 which is continuously in the peripheral direction, it is possible to improve a reliability in forming the space portion 36 in the engagement state between the gear tooth portion 26 of the sprocket 2 and the bush 8.

In this case, since the guide portion G is set to have the position and size as mentioned above, it is possible to secure the space portion 36 mentioned above even at a time when a predetermined abrasion is generated due to the use (an abrasion is generated in the case that the crawler type traveling apparatus is operated for an operating time corresponding to a service life). In particular, even when the end surface of the guide portion G is worn out 6 mm, and the protruding size becomes small, the end surface protrudes at 12.2 mm in an initial state as mentioned above, so that the end surface still protrudes from the gear tooth side surface 35 at (12.2-6) mm, that is, 6.2 mm, and it is possible to secure the later size of the space portion 36 (the size in the direction corresponding to the axial direction of the sprocket 2) equal to or more than 6 mm. Further, even when the bush 8 is worn out at 3 mm in the diametrical direction, and the sprocket 2 is worn out at 6 mm in the diametrical direction, it is possible to take the guide portion G apart from the outer peripheral surface of the bush 8 at {15−(3+6)} mm, that is, 6 mm, and it is possible to secure the diametrical size of the space portion 36 equal to or more than 6 mm, because the size C from the gear tooth bottom portion 30 to the concave portion 33b of the outer peripheral surface 33 in the guide portion C, as mentioned above.

Accordingly, since it is possible to secure the protruding size B of the guide portion G and the size C from the gear tooth bottom portion 30 to the guide portion G respectively equal to or more than 6 mm, even after the abrasion, the intrusion pressure of the earth and sand does not become great. Therefore, it is possible to prevent the seal member 10 of the bearing structure 5 from being damaged and being unusable while the other mechanisms or the like are usable. That is, it is not necessary to carry out the maintenance such as the replacement of the parts or the like due to the damage of the seal members 10 and 10 within an available operating time for the crawler type traveling apparatus, and it is possible to stably use the sprocket.

Figure 6:
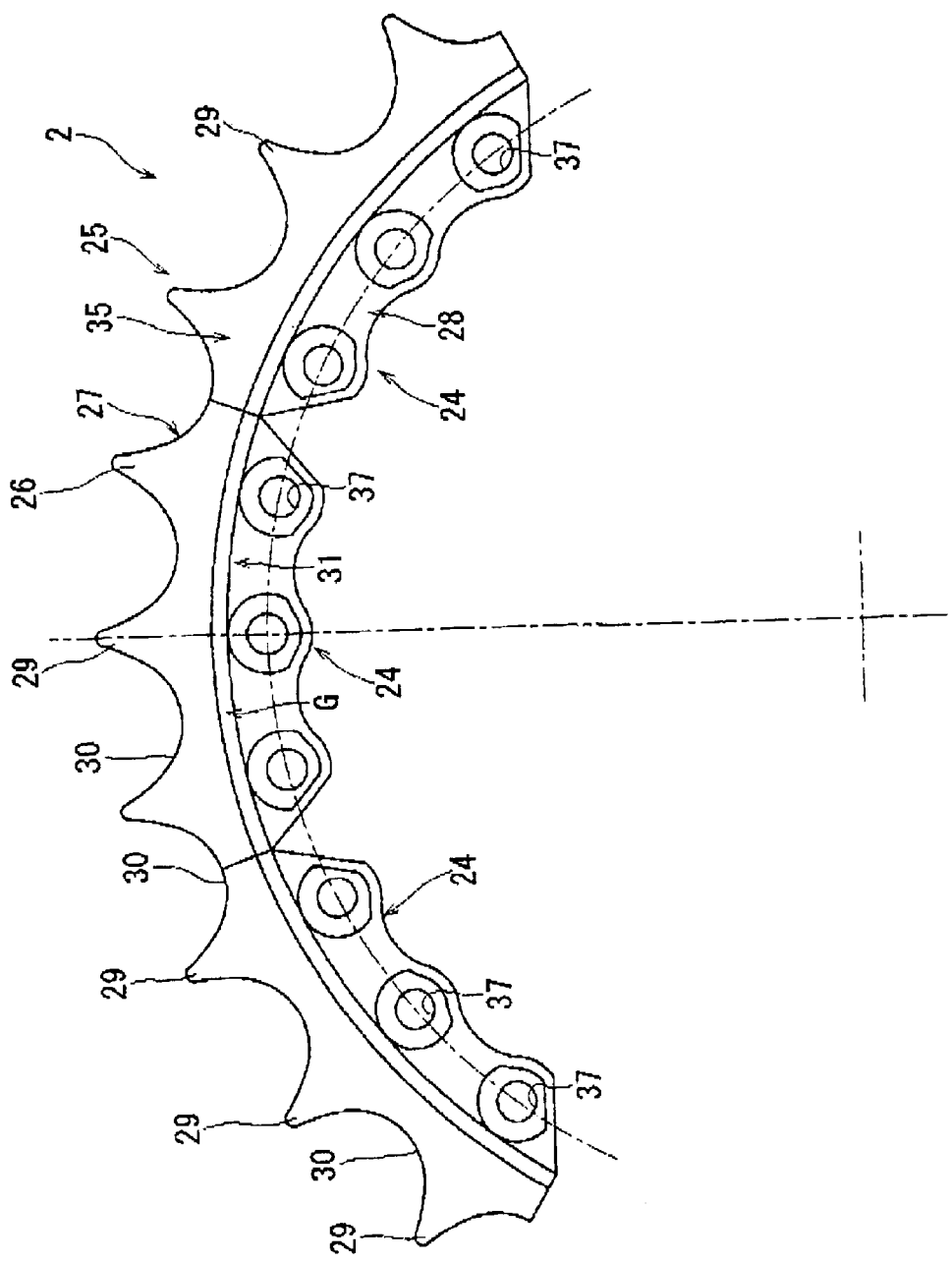
FIG. 6 is a side view of a main portion of another crawler belt sprocket of the crawler type traveling apparatus mentioned above.

Next, FIG. 6 shows a modified embodiment of the sprocket 2. In this sprocket 2, the guide portion G is structured by a protruding ring-shaped portion 31 having no concavo-convex portion in both of the inner and outer peripheral surfaces. Also in this case, since the space portion 36 is formed among the guide portion G, the gear tooth side surface 35 of the gear tooth portion 26 and the link 4 in the engagement state, it is possible to achieve the same operations and effects as those of the crawler type traveling apparatus shown in FIG. 1 or the like, even in the crawler type traveling apparatus using the sprocket 2. In this case, since the other structures are the same as those of the sprocket 2 shown in FIG. 2 or the like, the same elements are denoted by the same reference numerals, and a description thereof will be omitted.

Figure 7:
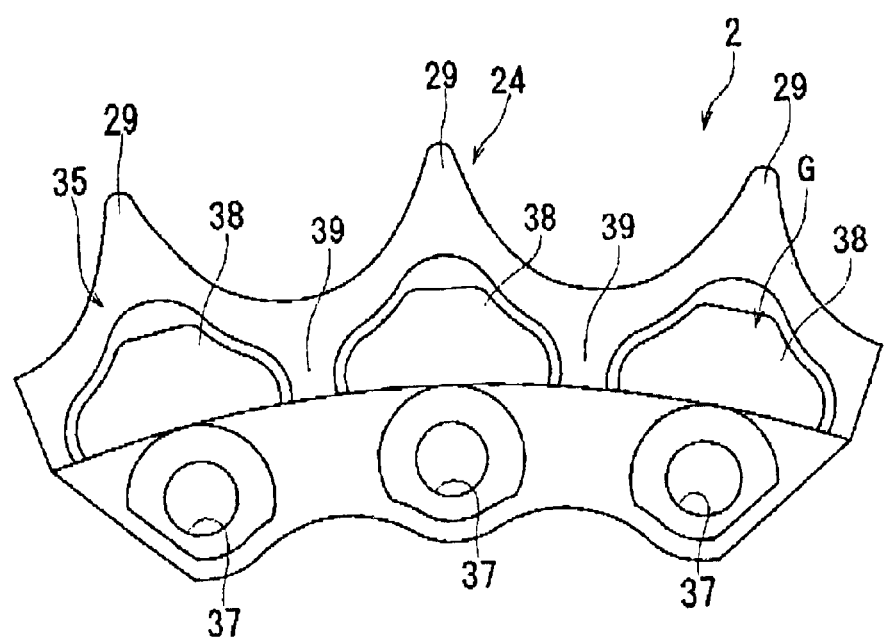
FIG. 7 is a side view of a main portion of the other crawler belt sprocket of the crawler type traveling apparatus mentioned above.
Figure 8:
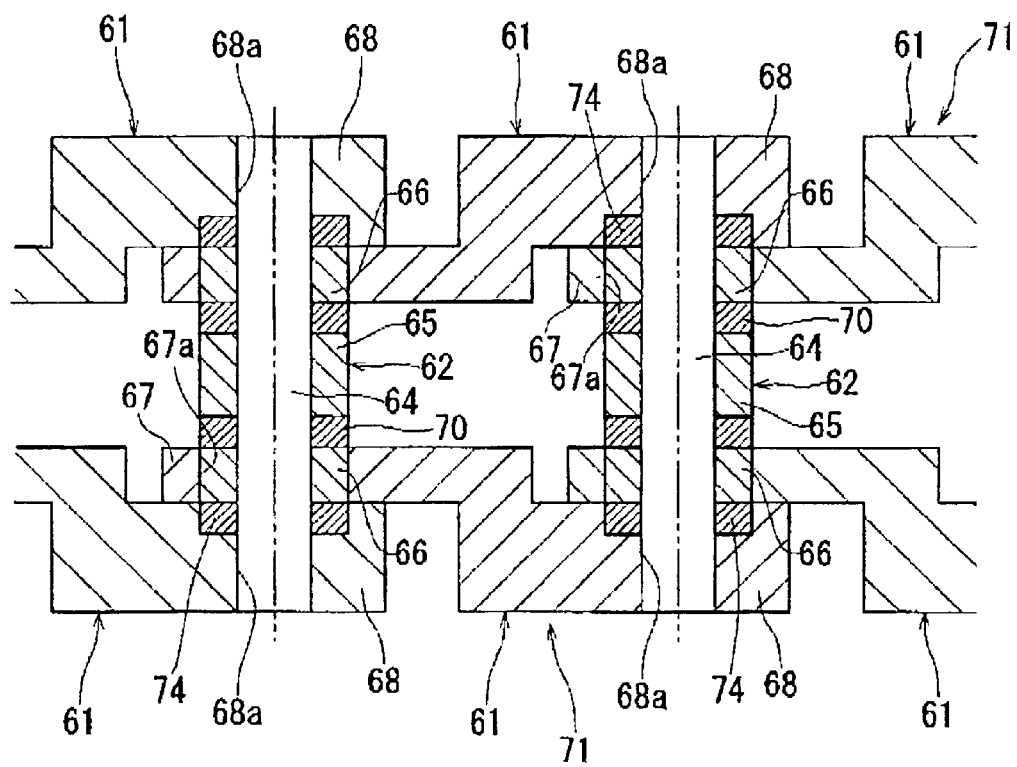
FIG. 8 is a brief cross sectional view of a conventional crawler type traveling apparatus.
Figure 9:
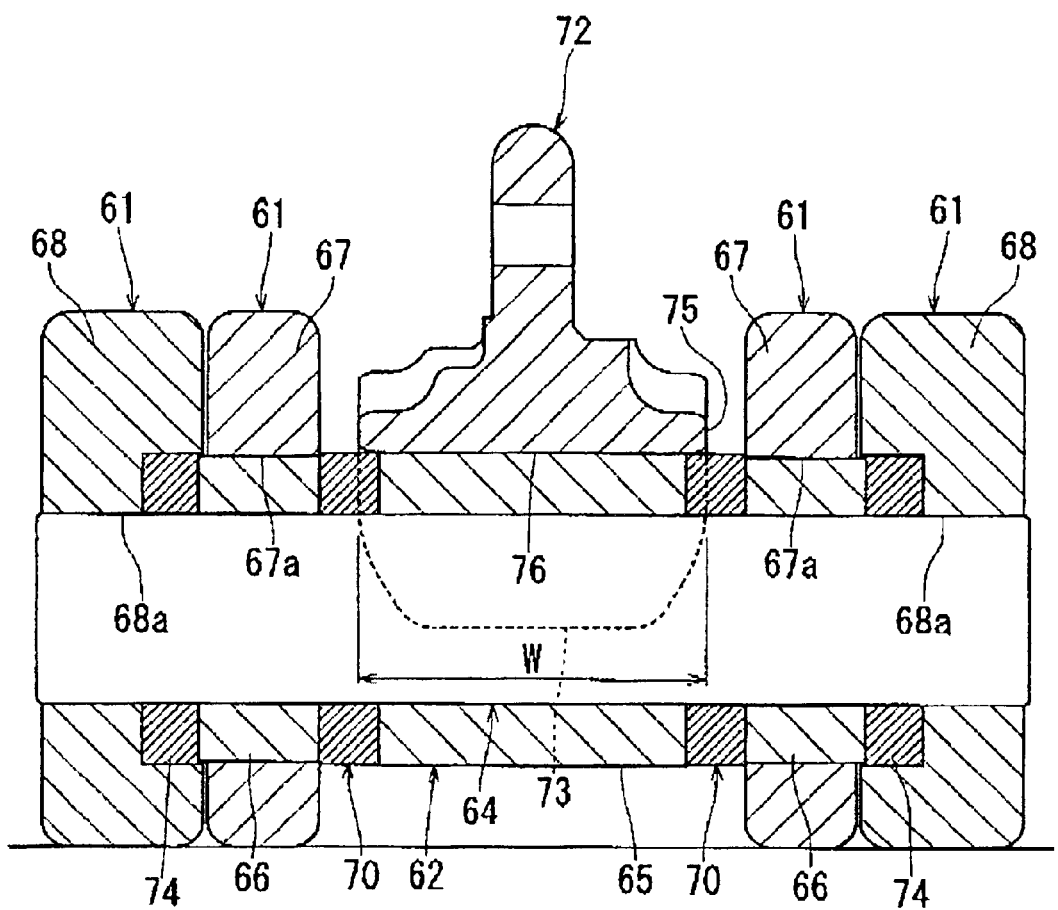
FIG. 9 is an enlarged cross sectional view of a main portion of the conventional crawler type traveling apparatus.

Further, in the sprocket 2 shown in FIG. 7, the guide portion G is constituted by a plurality of protruding portions 38 which are discontinuously provided along the peripheral direction. Accordingly, an interval portion 39 is formed between the protruding portions 38 and 38 which are adjacent to each other in the peripheral direction, and this interval portion 39 corresponds to the gear tooth bottom portion 30. That is, in the sprocket 2 shown in FIG. 2, the structure may be made such as to notch the corresponding portion to the gear tooth bottom portion 30 of the protruding ring-shaped portion 31 constituting the guide portion G and set the remaining portions to the protruding portions 38.

Accordingly, even in the sprocket 2 mentioned above, the space portion 36 can be formed among the guide portion G, the gear tooth side surface 35 of the gear tooth portion 26 and the link 4, in the engagement state between the gear tooth portion 26 and the bush 8. Further, since the interval portion 39 is arranged in correspondence to the gear tooth bottom portion 30, the earth arid sand making an intrusion into the gear tooth bottom portion 30 is pressed to a side of the interval portion 39 due to the pressing operation of the sprocket 2, and is discharged from the interval portion 39 to the external portion of the crawler type traveling apparatus. Accordingly, the crawler type traveling apparatus can more effectively avoid the damage of the seal members 10 and 10 due to the earth and sand intrusion, and can be stably driven for a long time period. Further, it is possible to intend to save a material cost by providing with the interval portions 39, and it is possible to achieve a reduction in the manufacturing cost.

The description is given above of the particular embodiments of the crawler type traveling apparatus in accordance with the present invention, however, the present invention is not limited to the embodiments mentioned above, and can be carried out by being variously changed within the scope of the invention. For example, the seal members 10 and 10 are not limited to the structure shown in FIG. 1 and the like, and it is possible to use various kinds of seal members (seal apparatuses) which have been conventionally used in this kind of crawler type traveling apparatus. Further, the seal members 10 and 10 may be arranged in a state of being received in the second bush 9. In this case, the structure may be made such that the recess portion is provided in the end surface in the side of the first bush 8 of the second bush 9, and the seal member 10 is fitted into the recess portion. Further, in the sprocket 2, it is free to increase or decrease the number of the segments 24, and the sprocket 2 may not be constituted by the segments 24. Further, the number of the gear teeth may be freely increased or decreased. In this case, since the protruding portion 38 of the sprocket 2 in FIG. 7 is formed in a shape obtained by the remaining portions after notching the corresponding portion to the gear tooth bottom portion 30 of the protruding ring-shaped portion 31, the protruding portion 38 is formed in the convex shape in the side view, however, the protruding portion 38 is not, of course, limited to this shape, and it is possible to employ various kinds of shapes such as a circular shape, an oval shape, a triangular shape, a rectangular shape and the like in the side view as far as the space portion 36 can be formed. Further, each of the sizes described in FIG. 1 is only one example, and in the crawler type traveling apparatus, the sizes can be optionally set as far as the guide portion G making an intrusion into the portion between the relatively facing links 4 and 4 is protruded from both side surfaces of the sprocket 2, in the engagement state between the gear tooth portion 26 of the sprocket 2 and the bush 8, and the space portion 36 can be formed between the guide portion G, the gear tooth side surface 35 of the gear tooth portion 26 in the sprocket 2, and the link 4. Further, the gear tooth portion 26 of the sprocket 2 may be hardened. It is possible to intend to achieve a long service life of the sprocket 2 by carrying out the hardening process.

Embodiment

Figure 10:
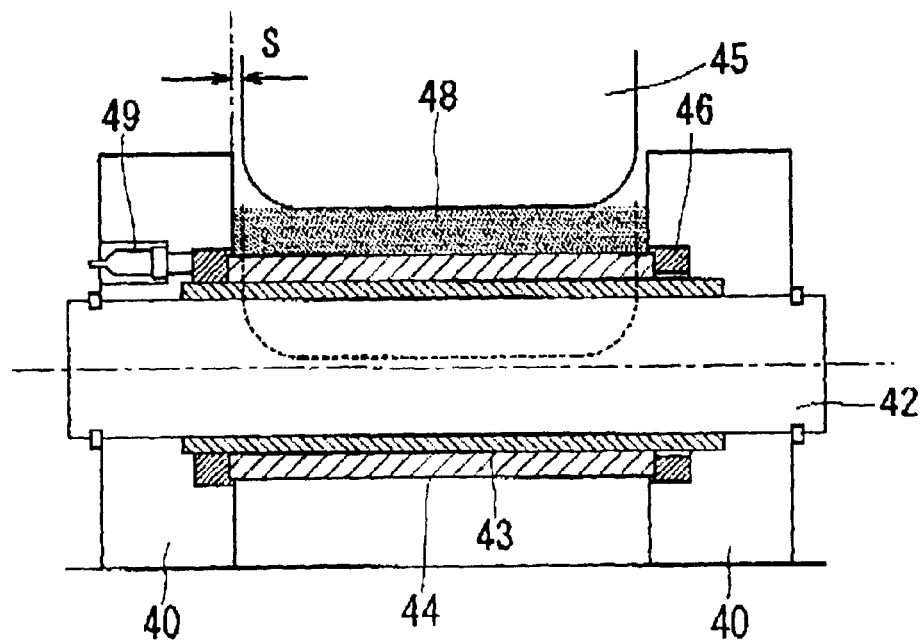
FIG. 10 is a brief view of a testing apparatus for searching a relation between a size of a space portion in the crawler type traveling apparatus and a generated soil pressure.

Next, a relation between the magnitude of the space portion mentioned above and the generated soil pressure is searched by using a test apparatus shown in FIG. 10 and reproducing a phenomenon that the earth and sand pressed to the sprocket makes an intrusion into the seal member.

Figure 11:
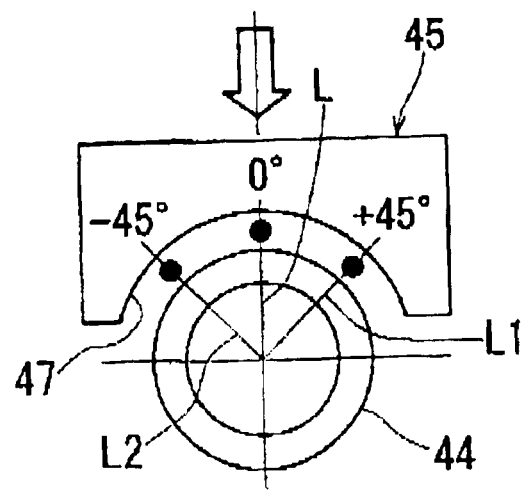
FIG. 11 is a brief view of a main portion of the testing apparatus mentioned above.

The test apparatus is provided with a shaft 42 which is supported to support frames 40 and 40, an inner bush 43 which is outward fitted to the shaft 42, an outer bush 44 which is outward fitted to the inner bush 43, and a pressing jig 45 which corresponds to the sprocket. Further, a seal member 46 is arranged in a side of an end portion of the outer bush 44. In this case, the pressing jig 45 is structured, as shown in FIG. 11, such that a recess groove 47 is formed in a lower surface thereof, and the recess groove 47 is formed in such a manner as to be fitted to the outer bush 44, thereby pressing a earth and sand 48 (refer to FIG. 10) interposed between the pressing jig 45 and the outer bush 44. In this case, pressure measuring positions are set on a center line L connecting a center of the pressing jig 45 to an axis of the outer bush 44, and lines L1 and L2 having 45 degrees with respect to the center line L, as shown in FIG. 11. Further, a pressure head 49 is provided in one support frame 40.

Figure 12:
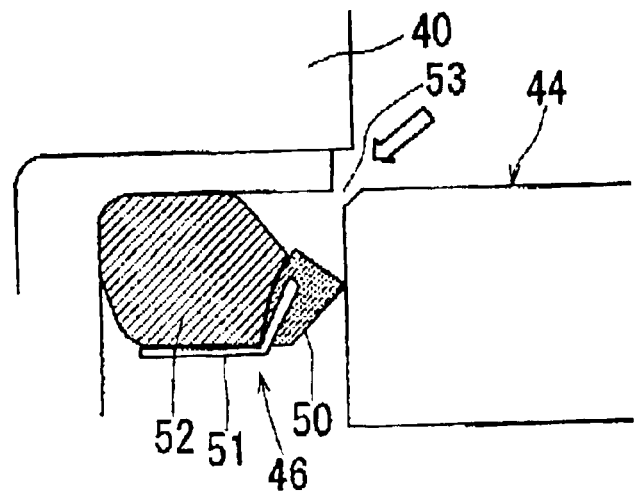
FIG. 12 is an enlarged cross sectional view showing a seal member of the testing apparatus mentioned above.

Further, the seal member 46 is provided with a seal ring 50 having a lip portion, a support ring 51 supporting the seal ring 50, and a load ring 52 receiving a pressing force from the lip portion of the seal ring 50, as shown in FIG. 12. That is, it is the same as the seal member 15 of the crawler type traveling apparatus shown in FIG. 1. Further, the lip portion of the seal ring 50 is in pressure contact with the end surface of the outer bush 44 by a pressure (for example, 50 kg/cm$^2$) applied from the pressure head 49. In this case, an earth and sand intrusion passage 53 is formed between the outer bush 44 and the support frame 40.

As shown in Table 1, a gap (a clearance in SP end surface) S is changed to 0 mm, 3 mm, 6 mm and 12 mm by setting a cone index of the used earth and sand to 32.2 (N/cm$^2$), a pressurizing speed (SP speed) VF to 43 (mm/s) (corresponding to a vehicle speed V 0.62 (km/h), and a pressurizing force to 98 (kN), and it is searched whether or not the earth and sand makes an intrusion into the seal member 46, and a result there of is shown in Table 1.

such that the size in the diametrical direction and the size in the axial direction in the space 36 are secured equal to or more than 6 mm, even after the predetermined abrasion due to the use, it is possible to securely intend to reduce the earth and sand intrusion pressure into the side of the seal member 10 during the use.

What is claimed is:

1. A crawler type traveling apparatus comprising: a crawler belt comprising a plurality of links sequentially connected together through bearing structure bodies, each bearing structure body having a pin, a bush outwardly fitted to the pin and seal members arranged in both end sides of the bush; and
    a crawler belt sprocket in which a gear tooth portion engages a portion between a pair of links that are connected together through said bearing structure body and that are engaged with said bush,
    wherein a space is formed between an outer side of said seal member and a guide portion of the gear tooth portion of said crawler belt sprocket, wherein the guide portion extends outwardly from a side of the gear tooth portion over said seal member.

2. A crawler belt sprocket in which a gear tooth portion engages a portion between a pair of links that are sequentially connected together through bearing structure bodies, each bearing structure body having a pin, a bush outwardly fitted to the pin, and seal members arranged in both end sides of the bush and facing each other, thereby being engaged with said bush, wherein a guide portion axially extends from both side surfaces of the gear tooth portion.

3. A crawler belt sprocket as claimed in claim 2, wherein said guide portion is constituted by an axially extending ring-shaped portion which is continuously provided in a peripheral direction.

4. A crawler belt sprocket as claimed in claim 2, wherein said guide portion is constituted by a plurality of axially extending portions which are discontinuously provided along a peripheral direction, and an interval portion between the adjacent protruding portions in the peripheral direction corresponds to a gear tooth bottom portion.

5. A crawler belt sprocket as claimed in any one of claims 2 to 4, wherein the length of the axially extending guide portion and the distance between the gear tooth bottom

TABLE 1

| No. | Cone index of used earth and sand (N/cm$^2$) | Vehicle speed V (km/h) | Sp speed VF (mm/s) | End surface clearance (mm) | Pressurizing force (KN) | Estimated generating soil pressure (MPa) Max in circumferential direction | Number of load (time) | Existence of segment intrusion (x: existence, o: none) Between seal ring and load ring | Back surface of load ring |
|---|---|---|---|---|---|---|---|---|---|
| 1 | 32.2 | 0.62 | 43 | 0 | 98 | 3.58 | 1 | x | x |
| 2 |  |  |  | 3 | 98 | 1.48 | 1 | o | x |
| 3 |  |  |  | 3 | 98 | 1.48 | 5 | x (Little amount) | x |
| 4 |  |  |  | 6 | 98 | — | 1 | o | o |
| 5 |  |  |  | 12 | 98 | — | 1 | o | o |
| 6 |  |  |  | 12 | 98 | — | 4 | o | o |

Figure 13:
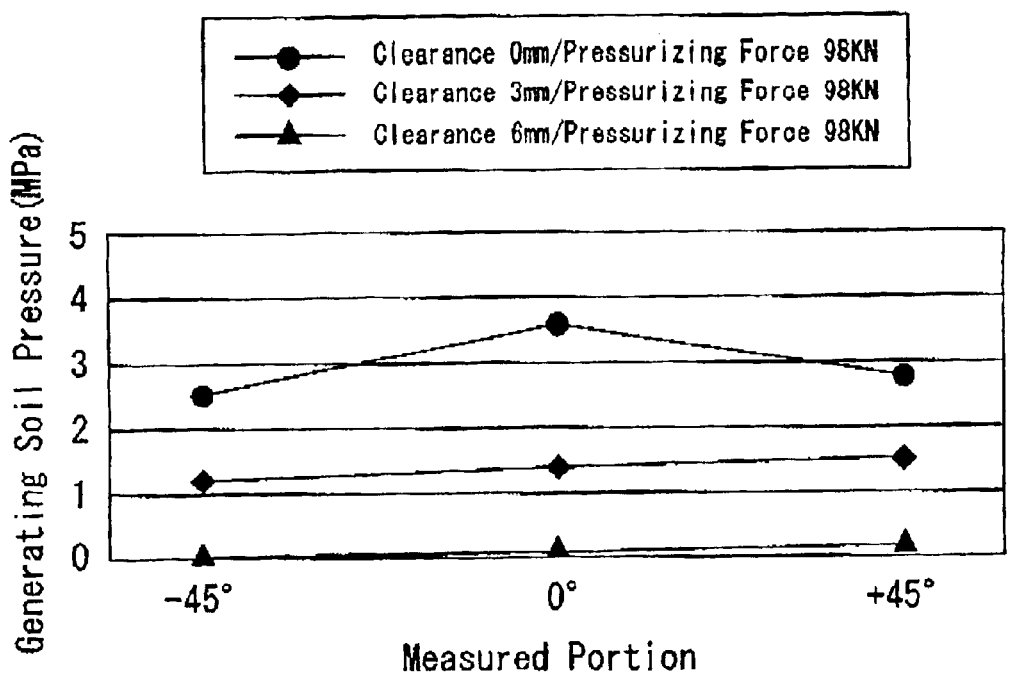
FIG. 13 is a graph showing a result of test using the testing apparatus mentioned above.

As shown in FIG. 13, it is known that the pressure on the center line L is maximum. This is because the earth and sand in both end sides functions as a wall in the center portion, and becomes in a consolidation state, and the other portions have an escape route for the earth and sand.

Figure 14:
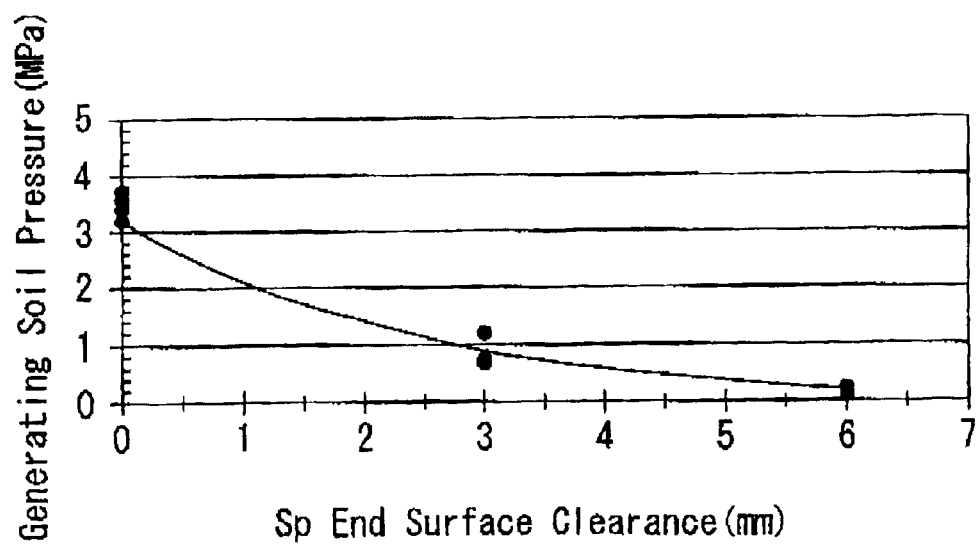
FIG. 14 is a graph showing a result of test using the testing apparatus mentioned above.

Further, as is known from FIG. 14 which shows a relation between the gap S and the generating soil pressure, it is known that the earth and sand does not make an intrusion if the gap S is equal to or more than 6 mm. Accordingly, as in the embodiment mentioned above, if the structure is made portion and said guide portion are respectively equal to or greater than 6 mm.

6. A segment of a crawler belt sprocket corresponding to a part of the crawler belt sprocket as claimed in any one of claims 2 to 4, wherein the segment is a member obtained by separating an outer peripheral portion of the crawler belt sprocket.

* * * * *